United States Patent
Gruber

(10) Patent No.: US 11,645,145 B2
(45) Date of Patent: May 9, 2023

(54) METHODS AND APPARATUS TO FACILITATE SPECULATIVE PAGE FAULT HANDLING IN A GRAPHICS PROCESSING UNIT

(71) Applicant: QUALCOMM Incorporated, San Diego, CA (US)

(72) Inventor: Andrew Evan Gruber, Arlington, MA (US)

(73) Assignee: QUALCOMM Incorporated, San Diego, CA (US)

(*) Notice: Subject to any disclaimer, the term of this patent is extended or adjusted under 35 U.S.C. 154(b) by 578 days.

(21) Appl. No.: 16/716,247

(22) Filed: Dec. 16, 2019

(65) Prior Publication Data

US 2021/0182140 A1    Jun. 17, 2021

(51) Int. Cl.
| | | |
|---|---|---|
| *G06F 11/07* | (2006.01) | |
| *G06T 1/60* | (2006.01) | |
| *G06F 9/30* | (2018.01) | |
| *G06F 9/38* | (2018.01) | |
| *G06F 9/50* | (2006.01) | |
| *G06F 9/54* | (2006.01) | |
| *G06F 12/0871* | (2016.01) | |

(Continued)

(52) U.S. Cl.
CPC ...... *G06F 11/0793* (2013.01); *G06F 9/30047* (2013.01); *G06F 9/3861* (2013.01); *G06F 9/5016* (2013.01); *G06F 9/5022* (2013.01); *G06F 9/544* (2013.01); *G06F 11/0772* (2013.01); *G06F 12/0871* (2013.01); *G06F 12/0882* (2013.01); *G06T 1/60* (2013.01); *G09G 5/001* (2013.01);

(58) Field of Classification Search
CPC .. G09G 5/001; G06T 1/20; G06T 1/60; G06T 15/80; G06F 11/0793; G06F 9/30047; G06F 9/3861; G06F 9/5016; G06F 9/5022; G06F 9/544; G06F 11/0772; G06F 12/0871; G06F 12/0882
USPC ........................................................ 345/530
See application file for complete search history.

(56) References Cited

U.S. PATENT DOCUMENTS

| | | | |
|---|---|---|---|
| 9,799,094 B1* | 10/2017 | Chen | G06T 9/00 |
| 2009/0251476 A1* | 10/2009 | Jiao | G06F 9/383 |
| | | | 345/543 |
| 2014/0075060 A1 | 3/2014 | Sharp et al. | |

(Continued)

OTHER PUBLICATIONS

International Search Report and Written Opinion—PCT/US2020/065101—ISA/EPO—dated Apr. 9, 2021.

*Primary Examiner* — Jacinta M Crawford
(74) *Attorney, Agent, or Firm* — Procopio, Cory, Hargreaves & Savitch

(57) ABSTRACT

The present disclosure relates to methods and apparatus for display processing. For example, disclosed techniques facilitate speculative page fault handling in a GPU. Aspects of the present disclosure can perform a graphics operation associated with using a set of constants within a flow control. Aspects of the present disclosure can also query a first memory to determine whether memory addresses associated with the set of constants are allocated at a constant buffer of the first memory. Further, aspects of the present disclosure can set a page fault indicator to a true value when the query indicates that at least one memory address associated with the set of constants is unallocated at the constant buffer, and set the page fault indicator to a false value otherwise.

21 Claims, 4 Drawing Sheets

(51) Int. Cl.
 *G06F 12/0882* (2016.01)
 *G09G 5/00* (2006.01)

(56) References Cited

U.S. PATENT DOCUMENTS

2018/0232846 A1   8/2018   Gruber et al.
2018/0373556 A1   12/2018  Tian et al.

* cited by examiner

```
Preamble {
    // initiate indicator (e.g., a one-bit flag)    ← 304
    PF_result = 0;

// perform pre-fetch queries for two sets of constants    ← 306
    PF_result=query(Constant Buffer LocationN in Memory);    ← 306a
    PF_result=query(Constant Buffer LocationM in Memory);    ← 306b // perform pre-fetch of the constants if the value of the indicator is false    ← 308
    // constants that are pre-fetched can be used for any pixel of the main portion
    // otherwise, both pre-fetch operations are not preformed
    if(!PF_result) LD_C.k C0 – Constant Buffer Location N in Memory;    ← 308a
    if(!PF_result) LD_C.k C1 – Constant Buffer Location M in Memory;    ← 308b
}

Main {
    // if constant at location N is needed during operation, check if fetch is needed    ← 352
    // perform fetch if needed to load the constant in the constant store
    if(A)
    {if (PF_result), LD_C.k C0 – Constant Buffer Location N in Memory;    ← 352a
    ADD R0 – R1 + C0; }    ← 352b // perform command using constant at constant store location C0 (either pre-fetched or fetched)
    // constant at location M is needed during operation, check if fetch is needed    ← 354
    else
    // perform fetch if needed to load the constant in the constant store
    {if (PF_result), LD_C.k C1 – Constant Buffer Location M in Memory;    ← 354a
    ADD R0 – R1 + C1; } }    ← 354b
```

302 ⟵ (Preamble block)
350 ⟵ (Main block)
300

FIG. 3

METHODS AND APPARATUS TO FACILITATE SPECULATIVE PAGE FAULT HANDLING IN A GRAPHICS PROCESSING UNIT

TECHNICAL FIELD

The present disclosure relates generally to processing systems and, more particularly, to one or more techniques for display or graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a display processor, a display processing unit (DPU), or a video processor. The apparatus can perform a graphics operation associated with using a set of constants within a flow control. The apparatus can also query a first memory to determine whether memory addresses associated with the set of constants are allocated at a constant buffer of the first memory. Additionally, the apparatus can set a page fault indicator to a true value when the query indicates that at least one memory address associated with the set of constants is unallocated at the constant buffer, and set the page fault indicator to a false value otherwise.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3 illustrates an example command stream including a preamble portion of the command stream and a main portion of the command stream, in accordance with one or more techniques of this disclosure.

DETAILED DESCRIPTION

Figure 1:
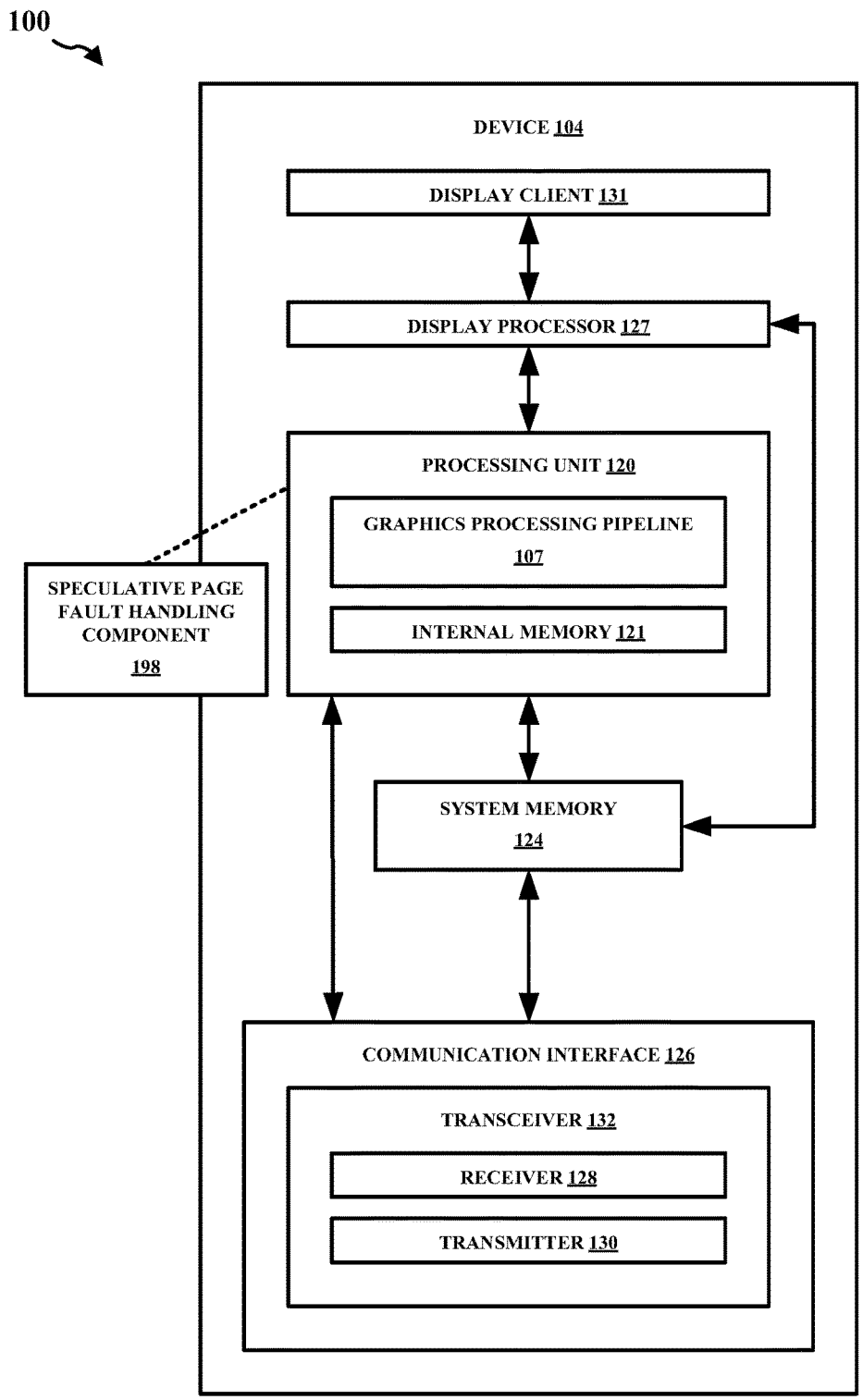
FIG. 1 is a block diagram that illustrates an example content generation system, in accordance with one or more techniques of this disclosure.

In general, examples disclosed herein provide techniques for facilitating speculative page fault handling in a GPU. In some examples, a GPU may be configured to render a graphical object. For example, the GPU may receive a graphical operation, such as a draw call command, including one or more instructions that define a set of one or more graphics primitives (e.g., points, lines, triangles, patches, etc.) to be rendered by the GPU. In some examples, the GPU may process many pixels to execute a single draw call command. Furthermore, in some examples, executing a draw call command may cause the GPU to use one or more of the same inputs. For example, a rotation matrix may include one or more of the same shared values that may be applied by the GPU to each of the pixels in a frame. In some examples, the GPU may fetch the one or more shared values when processing each of the pixels of the graphical object. However, it may be beneficial for the GPU to pre-fetch the one or more shared values (e.g., constants) at the start of the graphical operation. As used herein, the term "constant" refers to a real number or a set of real numbers (e.g., one or more values) that may be applied to different pixels of a graphical object.

In some examples, the GPU may pre-fetch the constants at the start of a graphical operation and store the constants in a memory that is easy to access by the GPU. For example, the GPU may access the constants at a constant buffer and store the constants in a constant store that may be efficiently accessed by the GPU. In some examples, the constant store may be a high-speed, specialized graphics memory that is located close to the processing units (e.g., graphical arithmetic logic units (ALUs)) of the GPU. For example, the constant store may be included in a high-speed, on-chip graphics memory (GMEM), a cache, a set of general purpose registers, etc.

In some examples, the GPU may receive a command stream that, when executed, renders a graphical object. For example, the command stream may include a flow control (or flow of control) that defines an order which the instructions of the graphical operation are executed. However, in some examples, the flow control may be conditional, which may result in different branches (or paths) of the command stream being executed. In some such examples, different sets of constants may be applied to different pixels depending on which branch is being executed by the GPU. For example, a first example branch may correspond to a positive one-degree rotation and, thus, the GPU may apply a first rotation matrix to the pixels of a graphical object, while a second example branch may correspond to a negative one-degree rotation and, thus, the GPU may apply a second rotation matrix to the pixels of the graphical object. In some such examples, it may beneficial for the GPU to pre-fetch a "best guess" set of constants or to pre-fetch both sets of constants, even if one set of constants is not used.

However, it should be appreciated that in some examples, as the quantity of constants that are being pre-fetched increases, the likelihood of a page fault occurring may also increase. For example, attempting to pre-fetch two sets of constants, and where one set is unused, may increase the likelihood of a page fault occurring as the quantity of constants being accessed (or attempted to be accessed) at the constant buffer increases. As used herein, the term "page fault" refers to instances in which the GPU attempts to access a constant at the constant buffer that is not mapped (at that time) for the command buffer. As used herein, the term "speculative page fault" is a type of page fault and refers to instances in which a shader is written so different branches may be taken, and the GPU performs one or more pre-fetches for different data for different branches, regardless of whether any particular branch is actually taken during runtime, and a page fault occurs for at least one of the data. As used herein, the term "pre-fetch" refers to instances in which the GPU preemptively loads data (e.g., the GPU loads "constants" from the constant buffer to a constant store). For example, a pre-fetch operation may occur during a preamble portion of a command stream.

Example techniques disclosed herein facilitate performing one or more pre-fetch queries at the start of a graphics operation (sometimes referred to as a "preamble" of the graphics operation). As used herein, the term "preamble" refers to a first portion of a graphics operation that includes one or more commands (or instructions) that are executable by the GPU to initialize the GPU. For example, executing the preamble portion of a command stream associated with a graphics operation may cause the GPU to pre-fetch one or more constants from the constant buffer to the constant store. In some examples, after execution of the preamble portion of the command stream is completed, the GPU may execute a main portion of the command stream associated with the processing of the pixels of the graphical object. In some examples, executing the main portion of the command stream may include applying the one or more constants stored in the constant store to the pixels of the graphical object.

In some examples, a query is a request for information triggered by the GPU. For example, a pre-fetch query may be a request, from the GPU, for information to determine whether memory addresses associated with the one or more constants are allocated at the constant buffer. In some such examples, the pre-fetch query may return a first value when a result of the request for information indicates that memory addresses associated with the one or more constants are unallocated at the constant buffer, and may return a second value when a result of the request for information indicates that memory addresses associated with the one or more constants are allocated at the constant buffer.

Example techniques disclosed herein determine and employ an indicator to track the results of the pre-fetch queries. In some examples, the indicator may be a one-bit flag set to indicate whether performing a pre-fetch may result in a page fault based on the results of the pre-fetch queries. For example, the preamble portion of the command stream may include respective pre-fetch queries for the one or more constants associated with the command stream. In some such examples, the GPU may set the one-bit flag to a first value (e.g., a "1," a true value, etc.) when any of the results of the pre-fetch queries indicates that the memory addresses associated with the respective constants are unallocated at the constant buffer and, thus, that a page fault may occur if the GPU performs a pre-fetch of the respective constants. Otherwise, the GPU may set the one-bit flag to a second value (e.g., a "0," a false value, etc.) when all of the results of the pre-fetch queries indicates that the memory addresses associated with the respective constants are allocated at the constant buffer and, thus, that a page fault may not occur if the GPU performs a pre-fetch of the respective constants.

Example techniques disclosed herein also facilitate determining whether to perform the pre-fetch operations of the one or more constants based on the value of the indicator. For example, when the indicator is set to the first value (e.g., a "1," a true value, etc.) indicating that a page fault may occur, the GPU may determine to skip performing pre-fetch operations for the one or more constants and initiate executing the main portion of the command stream. Otherwise, if, after performing all of the pre-fetch queries of the preamble portion of the command stream, the indicator is set to the second value (e.g., a "0," a false value, etc.) indicating that a page fault may not occur, the GPU may perform the pre-fetch operations to load the respective constants to the constant store (e.g., the memory of the GPU) prior to initiating execution of the main portion of the command stream.

In some examples, during execution of the main portion of the command stream, techniques disclosed herein may use the value of the indicator to determine whether to fetch a constant when a command includes a constant. For example, when a command of the main portion of the command stream indicates operating on a first constant, disclosed techniques may perform a fetch operation to load the constant from a system memory to the constant store when the indicator is set to the first value (e.g., a "1,", a true value, etc.) indicating that a page fault may occur. Examples techniques disclosed herein may then execute the command operating on the respective constant from the constant store (e.g., the memory of the GPU).

Thus, it should be appreciated that example techniques disclosed herein facilitate speculative page fault handling in a GPU. Furthermore, disclosed techniques facilitate improving performance of a conditional command stream at the GPU by allowing pre-fetching to occur with correct processing or avoiding page faults. Additionally, by eliminating the possibility of a page fault occurring during speculation based on the value of the indicator, disclosed techniques may facilitate reducing state storage information associated with speculative page faults.

As an example, a particular shader may facilitate rotating a frame positive one-degree or negative one-degree, and where a first rotational matrix provides constants associated with the positive one-degree rotation and a second rotational matrix provides constants associated with the negative one-degree rotation. However, at any one moment in time, only one of the first rotational matrix or the second rotational matrix will actually be used (e.g., the frame will be rotated positive one-degree or negative one-degree at any one point in time).

During execution of the preamble portion of the command stream (sometimes referred to as a "program"), the GPU could perform pre-fetch operations of the first rotational matrix and the second rotational matrix. If either matrix is not available at the constant buffer, then the page fault that occurs is a speculative page fault since the system does not know which matrix will actually be used to perform the rotation of the frame (e.g., during execution of the main portion of the command stream). If, for example, performing the pre-fetch operation of the second rotational matrix results in a page fault, then the system maintains an error report throughout operation of the command stream.

During execution of the main portion of the command stream, the flow control may follow a branch that applies the first rotational matrix to the frame. Since performing the pre-fetch operation of the first rotational matrix did not result in a page fault (in the above example), the system is able to perform the operation of applying the first rotational matrix to the frame. However, it should be appreciated that resources are still being used by the system to store the error report associated with the performing of the pre-fetch operation for the second rotational matrix.

Using the example techniques disclosed herein, examples facilitate avoiding the generating of an error report due to a speculative page fault as the query result would have indicated that performing a pre-fetch operation may result in a page fault. Accordingly, disclosed techniques would not perform the pre-fetch operation of either rotational matrix (in the above example) during execution of the preamble portion of the command stream. However, it should be appreciated that in some examples, performing a fetch operation during the execution of the main portion of the command stream may still result in a page fault. For example, assuming that, during runtime, the shader proceeds down the branch associated with the second rotational matrix and then tries to fetch the second rotational matrix, if the appropriate pages are not available at the constant buffer (for any suitable reason), then a page fault may still occur.

However, in such an example in which a page fault occurs during execution of the main portion of the command stream, the speculative page fault does not occur, which may result in no error report being generated due to the speculative page fault and that the system would maintain throughout operation of the command stream. Furthermore, it should be appreciated that the disclosed techniques enable a determination to be made during execution of the preamble portion of the command stream (e.g., to not perform pre-fetch operation(s) of the constants), and if the non-page-faulting branch is taken during execution of the command stream, then no error report due to a speculative page fault is generated (and maintained) during the execution of the preamble portion of the command stream and no error report due to a page fault is generated (and maintained) during the execution of the main portion of the command stream.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application (e.g., software) being configured to perform one or more functions. In such examples, the application may be stored on a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, examples disclosed herein provide techniques for speculative page fault handling in a GPU. Example techniques may improve performance and reduce power consumption by performing pre-fetch operations of one or more constants when a page fault may not occur based on the results of pre-fetch queries and performing the pre-fetch operations during a preamble portion of the command stream to reduce reloading of data from the constant buffer, and, thus, reducing the load on a communication interface (e.g., a bus), and/or reducing the load of a processing unit (e.g., any processing unit configured to perform one or more techniques disclosed herein, such as a GPU, a DPU, and the like). For example, this disclosure describes techniques for graphics and/or display processing in any device that utilizes a display. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to content produced by one or more processes of a graphics processing pipeline. In some examples, as used herein, the term "graphical content" may refer to content produced by a processing unit configured to perform graphics processing. In some examples, as used herein, the term "graphical content" may refer to content produced by a graphics processing unit.

In some examples, as used herein, the term "display content" may refer to content generated by a processing unit configured to perform display processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling (e.g., upscaling or downscaling) on a frame. In some examples, a frame may refer to a layer. In other examples, a frame may refer to two or more layers that have already been blended together to form the frame (e.g., the frame includes two or more layers and the frame that includes two or more layers may subsequently be blended).

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 includes a processing unit 120 and a system memory 124. In some examples, the device 104 can include a number of additional or alternative components, such as a communication interface 126, a transceiver 132, a receiver 128, a transmitter 130, a display processor 127, and a display client 131.

In the illustrated example of FIG. 1, the processing unit 120 includes an internal memory 121. The processing unit 120 may be configured to perform graphics processing, such as in a graphics processing pipeline 107. In some examples, the device 104 may include a display processor, such as the display processor 127, to perform one or more display processing techniques on one or more frames generated by the processing unit 120 before presentment by the display client 131. The display processor 127 may be configured to perform display processing. For example, the display processor 127 may be configured to perform one or more display processing techniques on one or more frames generated by the processing unit 120.

Reference to the display client 131 may refer to one or more displays. For example, the display client 131 may include a single display or multiple displays. The display client 131 may include a first display and a second display. In further examples, the results of the graphics processing may not be displayed on the device (e.g., the first and second displays may not receive any frames for presentment thereon). Instead, the frames or graphics processing results may be transferred to another device. The display client 131 may be configured to display or otherwise present frames processed by the display processor 127. In some examples, the display client 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as the system memory 124, may be accessible to the processing unit 120. For example, the processing unit 120 may be configured to read from and/or write to external memory, such as the system memory 124. In some examples, the processing unit 120 and the system memory 124 may be communicatively coupled to each other over the bus or a different connection.

It should be appreciated that in some examples, the device 104 may include a content encoder/decoder configured to receive graphical and/or display content from any source, such as the system memory 124 and/or the communication interface 126. The system memory 124 may be configured to store received encoded or decoded content. In some examples, the content encoder/decoder may be configured to receive encoded or decoded content (e.g., from the system memory 124 and/or the communication interface 126) in the form of encoded or decoded pixel data. In some examples, the content encoder/decoder may be configured to encode or decode any content.

The internal memory 121 or the system memory 124 may include one or more volatile or non-volatile memories or storage devices. In some examples, the internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that the internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium (e.g., the internal memory 121) and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include a communication interface 126. The communication interface 126 may include a receiver 128 and a transmitter 130. The receiver 128 may be configured to perform any receiving function with respect to the device 104. For example, the receiver 128 may be configured to receive information (e.g., eye or head position information, rendering commands, and/or location information) from another device. The transmitter 130 may be configured to perform any transmitting function with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

In some examples, the graphical content from the processing unit 120 for display via the display client 131 is not static and may be changing. Accordingly, the display processor 127 may periodically refresh the graphical content displayed via the display client 131. For example, the display processor 127 may periodically retrieve graphical content from the system memory 124, where the graphical content may have been updated by the execution of an application (and/or the processing unit 120) that outputs the graphical content to the system memory 124.

It should be appreciated that while shown as separate components in FIG. 1, in some examples, the display client 131 (sometimes referred to as a "display panel") may include the display processor 127. Furthermore, in some examples, the processing unit 120 may include the display processor 127.

Referring again to FIG. 1, in certain aspects, the processing unit 120 may include a speculative page fault handling component 198 to facilitate speculative page fault handling in a GPU. For example, the speculative page fault handling component 198 may be configured to perform a graphics operation associated with using a set of constants within a flow control. The speculative page fault handling component 198 may also be configured to query a first memory to determine whether memory addresses associated with the set of constants are allocated at a constant buffer of the first memory. Additionally, the speculative page fault handling component 198 may be configured to set a page fault indicator to a true value when the query indicates that at least one memory address associated with the set of constants is unallocated at the constant buffer, and to set the page fault indicator to a false value otherwise.

In some examples, the speculative page fault handling component 198 may be configured to perform respective pre-fetch operations for each constant of the set of constants when the page fault indicator is set to the false value, and to perform the graphics operation after the performing of the respective pre-fetch operations.

In some examples, the speculative page fault handling component 198 may be configured to perform the pre-fetch operations by loading the respective constants to a second memory that is an on-chip memory of the graphics processor. In some examples, the first memory may be associated with a first latency, the second memory may be associated with a second latency, and the first latency may be greater than the second latency.

In some examples, the speculative page fault handling component 198 may be configured to perform, without performing any pre-fetch operations, the graphics operation when the page fault indicator is set to the true value, and to perform respective fetch operations for each constant of the set of constants during the performing of the graphics operation.

In some examples, the speculative page fault handling component 198 may be configured to perform each of the respective fetch operations by loading the respective constant from the first memory to an on-chip memory of a graphics processor (e.g., the processing unit 120).

In some examples, the speculative page fault handling component 198 may be configured to query the first memory by determining whether accessing a respective constant of the set of constants during the performing of the graphics operation could result in a data fault.

In some examples, the speculative page fault handling component 198 may be configured to set the page fault indicator to the false value after the receiving of the graphics operation and before the querying of the first memory.

In some examples, the graphics operation may be associated with a plurality of pixels, and the speculative page fault handling component 198 may be configured to perform the querying of the first memory one time prior to the performing of the graphics operation associated with the plurality of pixels.

As described herein, a device, such as the device 104, may refer to any device, apparatus, or system configured to perform one or more techniques described herein. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, a phone, a smart phone, a server, a video game platform or console, a handheld device (e.g., a portable video game device or a personal digital assistant (PDA)), a wearable computing device (e.g., a smart watch, an augmented reality device, or a virtual reality device), a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

Figure 2:
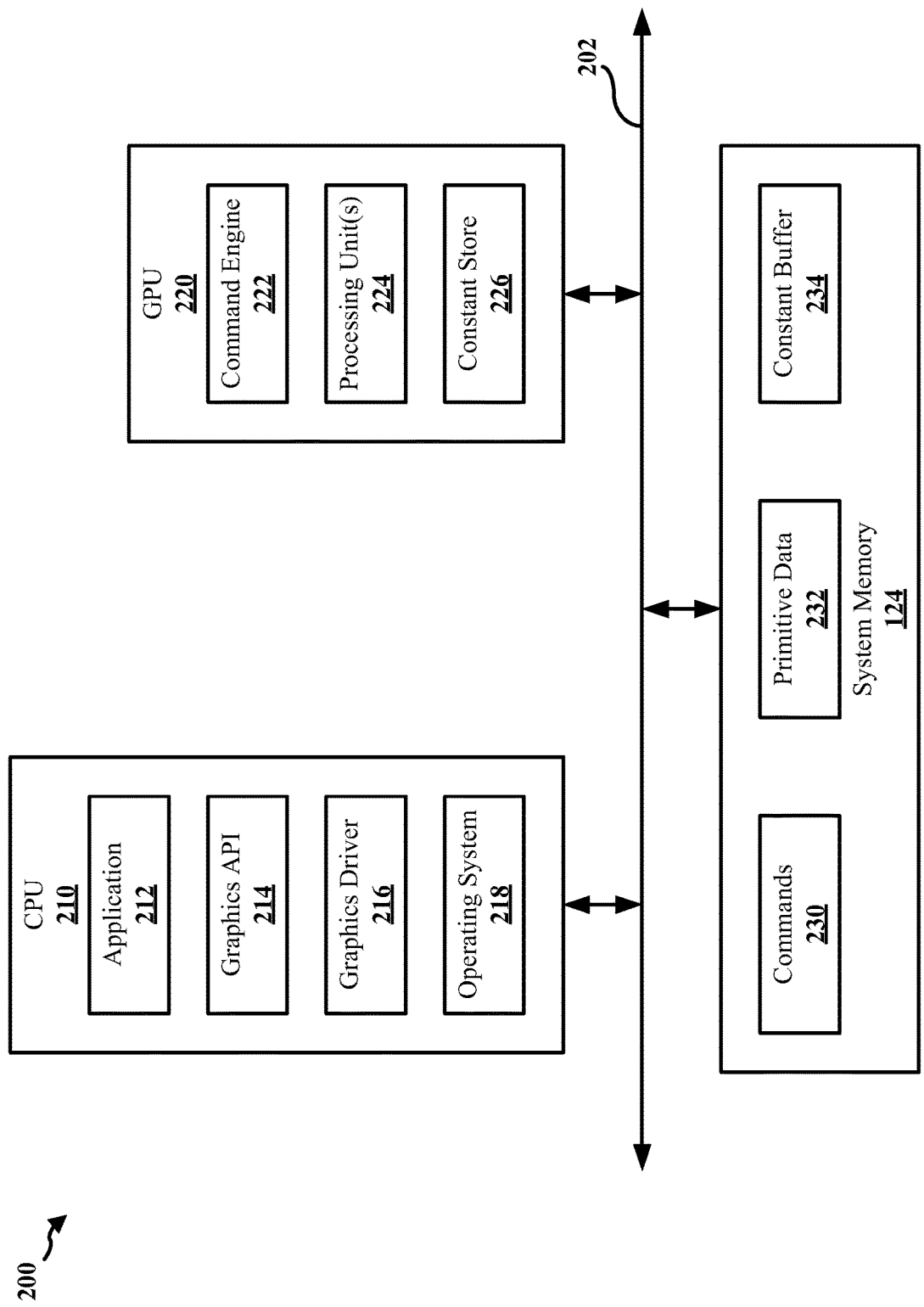
FIG. 2 is a block diagram illustrating components of the device of FIG. 1, in accordance with one or more techniques of this disclosure.

FIG. 2 is a block diagram 200 illustrating components of the device 104 of FIG. 1, in accordance with aspects of this disclosure. In the illustrated example of FIG. 2, the block diagram 200 includes a CPU 210, a GPU 220, and the system memory 124. In some examples, the CPU 210 and the GPU 220 may implement one or more aspects of the processing unit 120 of FIG. 1. For example, the CPU 210 and/or the GPU 220 may facilitate implementing one or more aspects of the speculative page fault handling component 198 of FIG. 1. As shown in FIG. 2, the example CPU 210, the example GPU 220, and the example system memory 124 are in communication via an example bus 202. The example bus 202 may be implemented using any combination of bus structures and/or bus protocols.

In the illustrated example of FIG. 2, the CPU 210 may include one or more processors that are configured to execute an application 212, a graphics application programming interface (API) 214, a graphics driver 216, and/or an operating system 218. In some examples, the CPU 210 may be configured to execute instructions that cause the CPU 210 to perform one or more of the example techniques disclosed herein.

The example GPU 220 of FIG. 2 includes a command engine 222, one or more processing unit(s) 224, and a constant store 226. In some examples, the command engine 222 and the one or more processing units 224 may be configured to implement aspects of the example graphics processing pipeline 107 of FIG. 1. In some examples, the GPU 220 may be configured to execute instructions that cause the GPU 220 to perform one or more of the example techniques disclosed herein. In some examples, one or more aspects of the constant store 226 may be implemented by the internal memory 121 of FIG. 1.

The example system memory 124 of FIG. 2 may store one or more commands 230, primitive data 232, and a constant buffer 234. In some examples, the system memory 124 may also store instructions that, when executed, cause the CPU 210, the GPU 220, and/or, more generally, the processing unit 120 of FIG. 1 to perform one or more of the example techniques disclosed herein.

In the illustrated example of FIG. 2, the GPU 220 may be configured to execute commands that are issued to the GPU 220 by the CPU 210. The commands executed by the GPU 220 may include draw call commands, graphics commands, state programming commands, memory transfer commands, general-purpose computing commands, etc. In some examples, the GPU 220 may be configured to perform graphics operations to render one or more graphics primitives for presentment (e.g., via the display client 131 of FIG. 1). In some such examples, when the application 212 executing on the CPU 210 requires graphics processing, the CPU 210 may provide graphics data to the GPU 220 for rendering and issue one or more graphics commands to the GPU 220. The graphics data may include vertex buffers, texture data, surface data, etc. In some examples, the CPU 210 may provide the graphics commands and the graphics data to the system memory 124, which may be accessed by the GPU 220.

In operation, the application 212 may be a graphics application that uses the GPU 220 to render one or more graphics objects into an image or frame to be displayed (e.g., via the display client 131). For example, the application 212 may include operations that cause the GPU 220 to rasterize and/or render a set of graphics primitives. In some examples, the application 212 may issue the operations to the graphics driver 216 via the graphics API 214. The example graphics API 214 may be a runtime service that translates the operations received from the application 212 into a format that is consumable by the graphics driver 216.

The example graphics driver 216 may receive the operations from the application 212 (e.g., via the graphics API 214) and may control operation of the GPU 220 to facilitate performing the operations. For example, the graphics driver 216 may generate one or more commands 230, store the commands 230 into the system memory 124, and instruct the GPU 220 to execute the commands 230. In some examples, the graphics driver 216 may store the commands 230 into the system memory 124 and communicate with the GPU 220 via the operating system 218 (e.g., via one or more system calls).

The example operating system 218 may provide a software platform upon which the application 212, the graphics API 214, and the graphics driver 216 may operate. In some examples, the operating system 218 may manage hardware details related to communicating and/or transferring data between the CPU 210, the GPU 220, and/or the system memory 124.

It should be appreciated that the commands 230 may include one or more draw call commands, one or more state commands, one or more memory transfer commands, etc. A state command may instruct the GPU 220 to change one or more state variables of the GPU 220, such as, for example, a primitive type. A draw call command may instruct the GPU 220 to render an object defined by a group of one or more vertices stored in the system memory 124 (e.g., in a vertices buffer). The geometry defined by the group of one or more vertices may, in some examples, correspond to one or more primitives (e.g., points, lines, triangles, patches, etc.) to be rendered (e.g., the primitive data 232). In general, a draw call command may cause the GPU 220 to render all of the vertices stored in a section of the system memory 124 (e.g., in the vertices buffer). In some such examples, once the GPU 220 receives the draw call command, control may be passed to the GPU 220 for rendering the geometry and primitives represented by the vertices in the defined section (e.g., the vertices buffer) of the system memory 124.

In the illustrated example, the command engine 222 may receive graphics processing commands and configure the processing units 224 to perform various operations for carrying out the graphics processing commands. As mentioned above, the command engine 222 and the processing units 224 may be configured to implement aspects of the example graphics processing pipeline 107 of FIG. 1.

In the illustrated example, the processing units 224 may include one or more processing units, each of which may be a programmable processing unit or a fixed-function processing unit. A programmable processing unit may include, for example, a programmable shader unit that is configured to execute one or more shader programs that are downloaded onto the GPU 220 from the CPU 210. In some examples, a shader program may be a compiled version of a program written in a shading language. In some examples, the programmable shader units may include vertex shader units, pixel shader units, geometry shader units, compute shared units, etc.

A fixed-function processing unit may include hardware that is hard-wired to perform certain functions. Although the fixed-function processing unit may be configurable to perform different functions (e.g., via one or more control signals), in some example, the fixed-function hardware may not include a program memory that is capable of received user-compiled programs (e.g., from the graphics API 214 and/or the graphics driver 216). In some examples, the fixed-function processing unit may include, for example, processing units that perform raster operations, such as depth testing, alpha blending, etc.

In some examples, the shader programs may be compiled as a command stream 230 (e.g., a "stream" or sequence of commands) including a preamble portion and a main portion. For example, the graphics API 214 and/or the graphics driver 216 may receive operations (e.g., via the application 212) to compile into the main portion of the command stream 230. In some examples, the main portion of the command stream 230 may correspond to one or more commands for processing the different pixels of a graphics object. Thus, it should be appreciated that commands executed during the main portion of the command stream 230 may be executed on a pixel-by-pixel basis.

As described above, the command stream 230 may also include a preamble portion. In some examples, the graphics API 214 and/or the graphics driver 216 may compile the preamble portion to facilitate initializing the GPU 220 for performing the command stream 230. For example, the preamble portion of the command stream 230 may include one or more pre-fetch operations to facilitate loading one or more shared values (e.g., constants) to a memory of the GPU 220. In the illustrated example, executing the preamble portion of the command stream 230 may facilitate loading one or more sets of constants from the constant buffer 234 of the system memory 124 to the constant store 226 of the GPU 220.

In the illustrated example, the constant buffer 234 of the system memory 124 may be a section of the system memory 124 that facilitates storing one or more sets of constants. It should be appreciated that the constants may be stored at different memory addresses of the system memory 124, and, in some examples, the memory addresses corresponding to the constants may be not contiguous. The example constant buffer 234 may store one or more contiguous blocks of memory addresses (referred to as "pages" or "memory pages"). As the size of the constant buffer 234 may be smaller than the size of the system memory 124 and/or may be smaller than the quantity of available constants, the constant buffer 234 may not include all possible constants that may be used within a command stream.

As an illustrative example, a set of constants may correspond to a rotation matrix including nine constants, each stored at a different memory address of the system memory 124. In some examples, the different constants may be stored at non-contiguous memory addresses that span across three different pages. For example, the first three constants (e.g., constants 1, 2, and 3) may be stored on a first page, the next three constants (e.g., constants 4, 5, and 6) may be stored on a second page, and the last three constants of the rotation matrix (e.g., constants 7, 8, and 9) may be stored on a third page. In some examples, the constant buffer 234 may be large enough to store the three pages associated with the rotation matrix (e.g., the first page, the second page, and the third page). However, it should be appreciated that in some examples, the three respective pages may not be the pages that are allocated for the constant buffer 234. For example, the constant buffer 234 may include the first example page (e.g., the memory addresses associated with the constants 1, 2, and 3 are allocated (or indexed) for the constant buffer 234), the second example page (e.g., the memory addresses associated with the constants 4, 5, and 6 are allocated (or indexed) for the constant buffer 234), and a fourth example page not associated with the constants of the rotation matrix.

It should be appreciated that in the above example, performing a pre-fetch operation to load the constants of the example rotation matrix from the constant buffer 234 to the constant store 226 may result in a page fault (or a data fault) as the constant buffer 234 does not have memory allocated to the last three constants of the rotation matrix (e.g., constants 7, 8, and 9). For example, a matrix may be fetched (or pre-fetched) at a point in the flow control and then, due to a branch being taken during the flow control, that fetched matrix being unused, or a matrix may not fetched (or pre-fetched) at a point in the flow control that is to be a used matrix at a later point in the flow control. That is, in the above example, the third example page is not allocated for the constant buffer 234, and, thus, performing a pre-fetch for those respective constants would result in a fault. Due to the speculative nature of the pre-fetch, this fault may not be a "real" fault in the sense that, in the absence of the speculative pre-fetch, the main portion of the command stream may not have encountered the fault in the particular flow control branch taken. Thus, the system, in the case of a speculative page fault, stores an error report that may be useful during debugging, but uses resources during runtime until determining whether the pre-fetch is "real" (e.g., the main portion of the command stream will take the particular flow control branch). For example, the error report may consume memory resources to store the error report and/or may consume processing resources to populate any fields associated with the error report.

Thus, it should be appreciated that while performing a pre-fetch to load the constants from the constant buffer 234 (e.g., of the system memory 124) to the constant store 226 (e.g., an on-chip memory accessible to the GPU 220), performing pre-fetch operations that may result in page faults may be resource costly.

Accordingly, example techniques disclosed herein facilitate performing a query of the constant buffer 234 (during the preamble portion of the command stream) to determine whether certain constants may be available at the constant buffer 234 for loading to the constant store 226. Based on the results of the queries, in some examples, the GPU 220 may perform a pre-fetch to load the respective constants from the constant buffer 234 to the constant store 226 prior to the executing of the main portion of the command stream 230. In other examples, the GPU 220 may determine to bypass the performing of the pre-fetch operations to load the constants based on the results of the queries.

Furthermore, to facilitate reducing memory overhead, example techniques use a same one-bit flag (or indicator) to store the results of each of the different queries. For example, the GPU 220 may perform three different queries to the constant buffer 234 to determine whether memory addresses associated with respective constants are allocated at the constant buffer 234 (e.g., "pre-fetch queries"). If the results of each of the three queries indicates that the respective constants are available for loading from the constant buffer 234, the example GPU 220 may set an indicator (e.g., "PF result") to a value indicating that performing pre-fetch operations of the respective constants may not result in a page fault (e.g., a "0," a false value, etc.). However, in some examples, if the result of any one of the three pre-fetch queries indicates that performing at least one pre-fetch operation associated with the respective constants may result in a page fault, the GPU 220 may set the indicator (e.g., "PF result") to a different value (e.g., a "1," a true value, etc.).

In some examples, the GPU 220 may perform the pre-fetch operations to load the respective constants after all the pre-fetch queries have been performed and the respective results indicate that performing pre-fetch operations of the respective constants may not result in a page fault (e.g., the "PF result" indicator is set to a false value). However, if any one pre-fetch query result indicates that a page fault may occur (e.g., the "PF result" indicator is set to a true value), then the GPU 220 may determine to bypass performing the pre-fetch operations to load the respective constants to the constant store 226.

Thus, it should be appreciated that the disclosed techniques enable the GPU 220 to appreciate the benefits of performing pre-fetch operations for the constants when the pre-fetch operations may not result in a page fault. Furthermore, it should be appreciated that the disclosed techniques enable the GPU to appreciate the benefits of bypassing the performing of the pre-fetch operations for the constants when at least one pre-fetch operation may result in a page fault.

FIG. 3 illustrates an example command stream 300 including a preamble portion 302 of the command stream 300 and a main portion 350 of the command stream 300, in accordance with one or more techniques of this disclosure. One or more aspects of the command stream 300 may be implemented by the example command stream 230 of FIG. 2. In the illustrated example, the preamble portion 302 of the command stream 300 includes pseudo-code for determining whether to perform pre-fetch operations and then performing the respective pre-fetch operations based on the determinations. The example main portion 350 of the command stream 300 includes pseudo-code for performing commands using constants associated with a graphics operation.

In the illustrated example of FIG. 3, the preamble portion 302 includes a first pseudo-code section 304 configured to set the value of the indicator (e.g., "PF result") to a false value. However, it should be appreciated that in some examples, the setting of the indicator may not be performed.

In the illustrated example of FIG. 3, the preamble portion 302 includes a second pseudo-code section 306 configured to perform the pre-fetch queries for the respective constants. As shown in FIG. 3, a first pre-fetch query 306a may be performed for determining whether the constant buffer 234 has allocated memory addresses associated with a first constant N. The example second pseudo-code section 306 also includes a second pre-fetch query 306b for determining whether the constant buffer 234 has allocated memory addressed associated with a second constant M. In the illustrated example, the value of the indicator (e.g., "PF result") is set after each of the queries 306a, 306b.

In the illustrated example of FIG. 3, the preamble portion 302 includes a third pseudo-code section 308 configured to perform the pre-fetch operations based on the value of the indicator (e.g., the "PF_result"). As shown in FIG. 3, if the value of the indicator is set to a false value, then a first pre-fetch operation 308a is performed to load the first constant N to a first address "C0" of the constant store 226. Additionally, a second pre-fetch operation 308b is performed to load the second constant M to a second address "C1" of the constant store 226. However, it should be appreciated that if the value of the indicator is set to a true value, then neither of the pre-fetch operations 308a, 308b may be performed.

It should be appreciated that the first constant N may represent one or more constants and that the second constant M may represent one or more constants. Furthermore, it should be appreciated that execution of the command stream 300 may result in using either the first constant N or the second constant M during run-time of the command stream 300. For example, during run-time of the command stream 300, a determination may be made whether to use a first rotation matrix associated with a positive one-degree rotation of a frame or to use a second rotation matrix associated with a negative one-degree rotation of the frame.

After the performing of the preamble portion 302, the GPU 220 may execute the main portion 350 of the command stream 300. In the illustrated example, the main portion 350 includes a first pseudo-code section 352 that determines whether a first branch is being performed (e.g., "if(A)") and, if so, whether to perform a fetch of the respective constant (e.g., the first constant N) for performing commands related to the first branch. For example, the first pseudo-code section 352 includes a check 352a to determine the value of the indicator (e.g., the "PF_result"). As shown in FIG. 3, if the value of the indicator is set to a true value, then the GPU 220 may load the first constant N from the constant buffer 234 to the memory address "C0" of the constant store 226. However, if the value of the indicator (e.g., the "PF_result") is set to a false value, then the first constant N was already loaded (e.g., pre-fetched during execution of the preamble portion 302) and a fetch of the first constant N is not performed. The GPU 220 may then perform an operation 352b using the first constant N.

Similarly, the main portion 350 includes a second pseudo-code section 354 that determines whether the first branch was not performed (e.g., "else") and, if so, whether to perform a fetch of the respective constant (e.g., the second constant M) for performing commands related to the second branch. For example, the second pseudo-code section 354 includes a check 354a to determine the value of the indicator (e.g., the "PF_result"). As shown in FIG. 3, if the value of the indicator is set to a true value, then the GPU 220 may load the second constant M from the constant buffer 234 to the memory address "C1" of the constant store 226. However, if the value of the indicator (e.g., the "PF_result") is set to a false value, then the second constant M was already loaded (e.g., pre-fetched during execution of the preamble portion 302) and a fetch of the second constant M is not performed. The GPU 220 may then perform an operation 354b using the second constant M.

As shown in the example of FIG. 3, when a constant is fetched during execution of the main portion 350 of the command stream 300, that constant is fetched on a pixel-by-pixel basis. That is, for each pixel being processed via the commands of the main portion 350, the GPU 220 may re-fetch the same shared value. However, by performing the pre-fetch operation and loading the constant in the constant store during the executing of the preamble portion, disclosed techniques enable the GPU to perform the loading of the respective constant into the constant once and that may be re-used for the different pixels.

It should be appreciated that in some examples, performing a fetch of a constant during execution of the main portion 350 may result in a page fault occurring. However, it should also be appreciated that in some such examples, performing a pre-fetch operation of the same constant may also have resulted in a page fault occurring. By deferring such page faults until execution of the main portion of the command stream 300, a page fault error indication to the system happens at the expected time within the GPU 220 (and/or the processing unit 224), which may simplify debugging of the page fault error.

Figure 4:
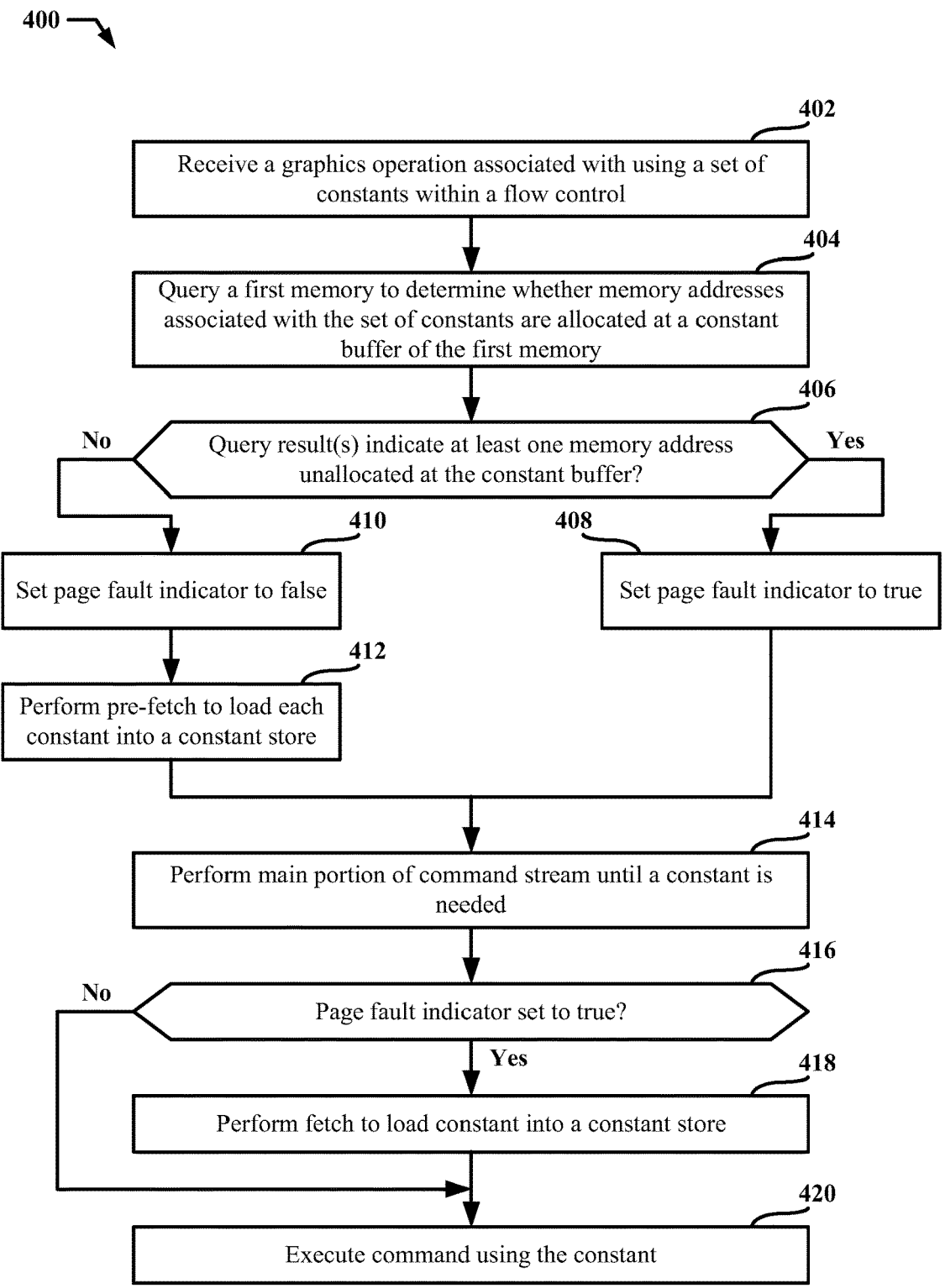
FIG. 4 illustrates an example flowchart of an example method, in accordance with one or more techniques of this disclosure.

FIG. 4 illustrates an example flowchart 400 of an example method in accordance with one or more techniques of this disclosure. The method may be performed by an apparatus, such as the device 104 of FIG. 1, the processing unit 120 of FIG. 1, the CPU 210 of FIG. 2, the GPU 220 of FIG. 2, a DPU, a video processor, and/or a component of the processing unit 120.

At 402, the apparatus may receive a graphics operation associated with using a set of constants within a flow control, as described in connection with the examples of FIGS. 1, 2, and/or 3. For example, the GPU 220 may receive the command stream 300 of FIG. 3 including commands associated with a first constant N and a second constant M.

At 404, the apparatus may query a first memory to determine whether memory addresses associated with the set of constants are allocated at a constant buffer of the first memory, as described in connection with the examples of FIGS. 1, 2, and/or 3. For example, the GPU 220 may query the constant buffer 234 of the system memory 124 to determine whether memory addresses associated with the first constant N and the second constant M are allocated at the constant buffer 234.

At 406, the apparatus may determine whether the query result(s) indicate at least one memory address is unallocated at the constant buffer, as described in connection with the examples of FIGS. 1, 2, and/or 3. For example, for each query performed, the GPU 220 may receive a result indicating whether a memory address associated with the respective constant is allocated at the constant buffer 234.

If, at 406, the apparatus determines that the query result(s) indicate at least one memory address is unallocated at the constant buffer, then, at 408, the apparatus may set a page fault indicator to true, as described in connection with the examples of FIGS. 1, 2, and/or 3. For example, the GPU 220 may set the indicator "PF_result" to a "1." As described above, when a memory address associated with at least one constant is not allocated at the constant buffer 234, then performing a pre-fetch of the respective constant could result in a page fault. Accordingly, by setting the page fault indicator to true, techniques disclosed herein facilitate improving performance by bypassing the performing of a pre-fetch based on the query results. Control may then continue to 414 to perform the main portion of the command stream.

If, at 406, the apparatus determines that the query result(s) do not indicate at least one memory address is unallocated at the constant buffer (e.g., all of the memory addresses associated with the set of constants are allocated at the constant buffer), then, at 410, the apparatus may set a page fault indicator to false, as described in connection with the examples of FIGS. 1, 2, and/or 3. For example, the GPU 220 may set the indicator "PF_result" to a "0."

At 412, the apparatus may perform respective pre-fetch operations for each constant of the set of constants, as described in connection with the examples of FIGS. 1, 2, and/or 3. For example, the GPU 220 may load each of the respective constants from the constant buffer 234 to the constant store 226 of the GPU 220.

At 414, the apparatus may perform the main portion of the command stream until a constant is needed, as described in connection with the examples of FIGS. 1, 2, and/or 3. For example, the GPU 220 may execute the commands of the main portion 350 of the command stream 300 until a command is reached that includes performing an operation using a constant, such as the first constant N or the second constant M.

At 416, the apparatus may determine whether the page fault indicator is set to true, as described in connection with the examples of FIGS. 1, 2, and/or 3. For example, when the page fault indicator is set to true (e.g., the indicator "PF_result" is set to a "1"), then the GPU 220 may determine that the constant is not available at the constant store 226 (e.g., a pre-fetch operation for the respective constant was not performed at 412). Otherwise, when the page fault indicator is set to false (e.g., the indicator "PF_result" is set to a "0), then the GPU 220 may determine that the constant is available at the constant store 226 (e.g., a pre-fetch operation for the respective constant was performed at 412).

If, at 416, the apparatus determines that the page fault indicator is set to true, then, at 418, the apparatus may perform a fetch operation to load the constant into the constant store, as described in connection with the examples of FIGS. 1, 2, and/or 3. For example, the GPU 220 may perform a fetch operation to retrieve the constant from the system memory 124 and store the constant in the constant store 226.

If, at 416, the apparatus determines that the page fault indicator is set to false, or after the apparatus performs the fetch at 418, then, at 420, the apparatus may execute the respective command using the constant, as described in connection with the examples of FIGS. 1, 2, and/or 3. For example, the GPU 220 may perform the respective command using the value of the constant stored in the constant store 226.

It should be appreciated that in some examples, after executing the command using the constant at 420, control may return to 414 to continue performing the main portion of the command stream.

In one configuration, a method or apparatus for display processing is provided. The apparatus may be a processing unit, a GPU, a display processor, a DPU, a video processor, or some other processor that can perform display processing. In some examples, the apparatus may be the processing unit 120 within the device 104, or may be some other hardware within the device 104, or another device. The apparatus may include means for receiving a graphics operation associated with using a set of constants within a flow control. The apparatus may also include means for querying a first memory to determine whether memory addresses associated with the set of constants are allocated at a constant buffer of the first memory. The apparatus may also include means for setting a page fault indicator to a true value when the query indicates that at least one memory address associated with the set of constants is unallocated at the constant buffer, and for setting the page fault indicator to a false value otherwise. The apparatus may also include means for performing respective pre-fetch operations for each constant of the set of constants when the page fault indicator is set to the false value. The apparatus may also include means for performing the graphics operation after the performing of the respective pre-fetch operations. The apparatus may also include means for loading the respective constants to a second memory that is an on-chip memory of the graphics processor. The apparatus may also include means for performing, without performing any pre-fetch operations, the graphics operation when the page fault indicator is set to the true value. The apparatus may also include means for performing respective fetch operations for each constant of the set of constants during the performing of the graphics operation. The apparatus may also include means for loading the respective constant from the first memory to an on-chip memory of the graphics processor. The apparatus may also include means for determining whether accessing a respective constant of the set of constants during the performing of the graphics operation could result in a data fault. The apparatus may also include means for setting the page fault indicator to the false value after the receiving of the graphics operation and before the querying of the first memory. The apparatus may also include means for performing the querying of the first memory one time prior to the performing of the graphics operation.

The subject matter described herein can be implemented to realize one or more benefits or advantages. For instance, the described display and/or graphics processing techniques can be used by a GPU, a display processor, a DPU, or a video processor or some other processor that can perform display processing to implement the speculative page fault handling in a GPU techniques disclosed herein. Moreover, the display or graphics processing techniques herein can improve or speed up data processing or execution. Further, the display or graphics processing techniques herein can improve resource or data utilization and/or resource efficiency. For example, aspects of the present disclosure can reduce the load of communication interfaces and/or reduce the load of a processing unit.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing, comprising:
performing a graphics operation associated with using a set of constants within a flow control, the set of constants being associated with a plurality of branches associated with the flow control;
querying a first memory to determine whether memory addresses associated with the set of constants are allocated at a constant buffer of the first memory, wherein the querying of the first memory comprises determining whether accessing a respective constant of the set of constants during the performing of the graphics operation could result in a data fault;
setting a page fault indicator to a true value when the query indicates that at least one memory address associated with the set of constants is unallocated at the constant buffer, wherein the at least one memory address associated with the set of constants being unallocated at the constant buffer corresponds to a speculative page fault associated with at least one pre-fetch operation and at least one branch in the plurality of branches; and
performing, without performing any pre-fetch operations, the graphics operation when the page fault indicator is set to the true value.

2. The method of claim 1, further comprising setting the page fault indicator to a false value when memory addresses associated with the respective set of constants is allocated at the constant buffer.

3. The method of claim 2, further comprising:
performing respective pre-fetch operations for each constant of the set of constants when the page fault indicator is set to the false value; and
performing the graphics operation after the performing of the respective pre-fetch operations.

4. The method of claim 3, wherein the performing of the pre-fetch operations comprises loading the respective constants to a second memory that is an on-chip memory of a graphics processor.

5. The method of claim 4, wherein the first memory is associated with a first latency, the second memory is associated with a second latency, and the first latency is greater than the second latency.

6. The method of claim 2, wherein the page fault indicator is set to the false value after the performing of the graphics operation and before the querying of the first memory.

7. The method of claim 1, further comprising:
performing respective fetch operations for each constant of the set of constants during the performing of the graphics operation.

8. The method of claim 7, wherein the performing of each of the respective fetch operations results in the respective constant being loaded from the first memory to an on-chip memory of a graphics processor.

9. The method of claim 1, wherein the graphics operation is associated with a plurality of pixels, and wherein the querying of the first memory is performed one time prior to the performing of the graphics operation associated with the plurality of pixels.

10. The method of claim 1, wherein the first memory is configured to be accessible to a graphics processor and a central processor.

11. An apparatus for graphics processing, comprising:
a memory; and
at least one processor coupled to the memory and configured to:
perform a graphics operation associated with using a set of constants within a flow control, the set of constants being associated with a plurality of branches associated with the flow control;
query a first memory to determine whether memory addresses associated with the set of constants are allocated at a constant buffer of the first memory, wherein the at least one processor is configured to query the first memory by determining whether accessing a respective constant of the set of constants during the performing of the graphics operation could result in a data fault;
set a page fault indicator to a true value when the query indicates that at least one memory address associated with the set of constants is unallocated at the constant buffer, wherein the at least one memory address associated with the set of constants being unallocated at the constant buffer corresponds to a speculative page fault associated with at least one branch in the plurality of branches; and
perform, without performing any pre-fetch operations, the graphics operation when the page fault indicator is set to the true value.

12. The apparatus of claim 11, wherein the at least one processor is further configured to set the page fault indicator to a false value when memory addresses associated with the respective set of constants is allocated at the constant buffer.

13. The apparatus of claim 12, wherein the at least one processor is further configured to:
perform respective pre-fetch operations for each constant of the set of constants when the page fault indicator is set to the false value; and
perform the graphics operation after the performing of the respective pre-fetch operations.

14. The apparatus of claim 13, wherein the at least one processor is configured to perform the pre-fetch operations by loading the respective constants to a second memory that is an on-chip memory of a graphics processor.

15. The apparatus of claim 14, wherein the first memory is associated with a first latency, the second memory is associated with a second latency, and the first latency is greater than the second latency.

16. The apparatus of claim 12, wherein the at least one processor is configured to set the page fault indicator to the false value after the performing of the graphics operation and before the querying of the first memory.

17. The apparatus of claim 11, wherein the at least one processor is further configured to:
perform respective fetch operations for each constant of the set of constants during the performing of the graphics operation.

18. The apparatus of claim 17, wherein the at least one processor is configured to perform each of the respective fetch operations by loading the respective constant from the first memory to an on-chip memory of a graphics processor.

19. The apparatus of claim 11, wherein the graphics operation is associated with a plurality of pixels, and wherein the at least one processor is configured to perform the querying of the first memory one time prior to the performing of the graphics operation associated with the plurality of pixels.

20. The apparatus of claim 11, wherein the apparatus includes a wireless communication device.

21. A non-transitory computer-readable medium storing computer executable code for display processing, comprising code to:
perform a graphics operation associated with using a set of constants within a flow control, the set of constants being associated with a plurality of branches associated with the flow control;
query a first memory to determine whether memory addresses associated with the set of constants are allocated at a constant buffer of the first memory, wherein the querying of the first memory comprises determining whether accessing a respective constant of the set of constants during the performing of the graphics operation could result in a data fault;
set a page fault indicator to a true value when the query indicates that at least one memory address associated with the set of constants is unallocated at the constant buffer, wherein the at least one memory address associated with the set of constants being unallocated at the constant buffer corresponds to a speculative page fault associated with at least one branch in the plurality of branches; and
perform, without performing any pre-fetch operations, the graphics operation when the page fault indicator is set to the true value.

* * * * *